United States Patent [19]
Saari

[11] 3,812,746
[45] May 28, 1974

[54] APPARATUS FOR FORMING EPITROCHOIDAL SURFACES

[75] Inventor: Oliver Edward Saari, Niles, Ill.

[73] Assignee: Illinois Tool Works Inc., Chicago, Ill.

[22] Filed: Oct. 11, 1972

[21] Appl. No.: 296,710

[52] U.S. Cl. ............................ 82/18, 82/1.3, 408/54
[51] Int. Cl. ............................ B23b 3/28, B23b 3/00
[58] Field of Search .......... 82/1, 1.3, 18, 19; 408/54

[56] References Cited
UNITED STATES PATENTS

| 167,614 | 9/1875 | Koch et al. | 82/18 |
|---|---|---|---|
| 701,217 | 5/1902 | Montreuil | 82/18 |
| 883,133 | 3/1908 | Green | 82/18 |
| 1,755,349 | 4/1930 | Casse | 82/18 |
| 1,929,270 | 10/1933 | Bickel | 82/19 |
| 2,348,881 | 5/1944 | Blood | 82/19 X |
| 2,870,578 | 1/1959 | Baier | 82/18 X |
| 2,909,010 | 10/1959 | Von Zelewsky | 82/18 X |
| 3,300,904 | 1/1967 | Gruner | 82/18 X |
| 3,494,388 | 2/1970 | Sanders et al. | 82/18 |
| 3,593,603 | 7/1971 | Gellert | 82/18 |

*Primary Examiner*—Harrison L. Hinson
*Attorney, Agent, or Firm*—Olson, Trexler, Wolters, Bushnell & Fosse Ltd.

[57] ABSTRACT

The present invention relates generally to apparatus for forming with a high degree of accuracy an epitrochoidal surface in a recessed workpiece, and more particularly to novel and practical mechanism for forming such surfaces in the cylinder block of a rotary type internal combustion engine. The embodiment of the invention disclosed herein comprises a machine frame upon which is mounted means for supporting a recessed workpiece or cylinder block and for rotating said workpiece at a predetermined speed in a given direction about a first fixed axis. A tool actuating member or spindle is rotatable in the opposite direction about a second fixed axis which is parallel to and spaced laterally from said first fixed axis. A tool supporting means or boring bar is coupled with said actuating spindle through the agency of a unique device which oscillates about a third fixed axis and serves to maintain the cutting edge of said tool in position for actively forming an epitrochoidal surface as the workpiece rotates at a relatively high predetermined speed in one direction and the tool actuating means rotates at a predetermined faster speed in the opposite direction.

19 Claims, 20 Drawing Figures

APPARATUS FOR FORMING EPITROCHOIDAL SURFACES

SUMMARY OF THE INVENTION

One of the problems incident to the design of a machine or mechanism for forming an epitrochoidal surface in the cylinder block of a rotary type internal combustion engine is that of removing or cutting away stock at an appreciable speed. To operate such a machine at relatively high speeds introduces the problem of maintaining the rapidly moving parts thereof in kinetic balance. Such cylinder blocks are relatively heavy and if rotated about a fixed axis at high speeds they exhibit a tendency to cause vibration which may result in operational unbalance. In the machines heretofore available for forming epitrochoidal surfaces in the cylinder blocks of rotary type engines the speed of operation has been relatively slow, thereby adding materially to the cost of manufacture.

It is therefore an important object of the present invention to provide practical and efficiently operable mechanism or apparatus for rapdily forming an epitrochoidal surface within a recessed cylinder block, or the like, with a high degree of accuracy, and without experiencing vibrations which might otherwise result from unbalanced machine operation.

It is a further object of the present invention to provide novel and efficiently operable means whereby a single tool element or cutter, such as the cutting tool of the type carried by a conventional boring bar, may be employed to form an epitrochodidal surface in a rotating recessed workpiece such as a cylinder block having a cavity for accommodating a rotor.

Another and more specific object of the present invention is to provide a unique mechanism for coupling a rotary tool actuating device or spindle and a tool supporting member such as a boring bar laterally offset from the spindle axis, said mechanism being operable in such a manner as to precisely locate the cutting extremity of a supported tool in a position of contact with the surface defining the cavity in a workpiece, whereby, as the workpiece rotates at relatively high speed about an axis coincident with the center of the work cavity an accurate epitrochoidal surface will be formed.

More specifically, the invention contemplates apparatus of the type set forth above, wherein the coupling means between the tool actuating means and the tool supporting means oscillates within predetermined limits about a fixed axis, so as to maintain said fixed axis and the point of engagement of the tool element with the surface defining the work cavity in a common plane extending normal to a line tangent to the epitrochodial surface at the point of contact of the tool with the workpiece.

BRIEF DESCRIPTION OF THE DRAWINGS

The foregoing and other objects and advantages will be more apparent from the following detailed description when considered in connection with the accompanying drawings wherein.

DESCRIPTION OF AN EMBODIMENT OF THE INVENTION

Figure 12:
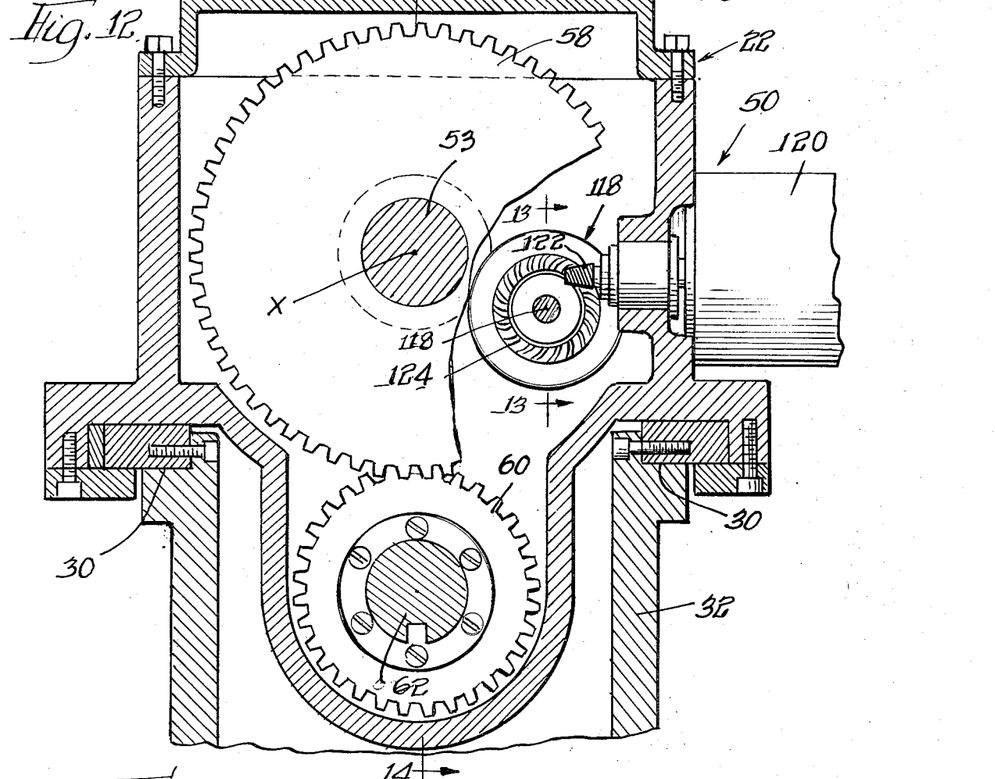
FIG. 12 is a fragmentary vertical sectional view taken substantially along the line 12—12 of FIG. 1.

Referring now to the drawings more in detail, wherein like numerals have been employed to designate similar parts throughout the various views, it will be seen that one embodiment of the present invention contemplates a machine tool or apparatus designated generally by the numeral 22. The machine 22 includes a base or bed 24 which serves to support a horizontally shiftable head stock 26 and a stationary tail stock 28. The head stock 26 is horizontally slidable along guideway 30, FIGS. 2, 4 and 12, provided along the upper margins of a supporting base section 32, secured to the upper surface of the bed 24.

Figure 1:
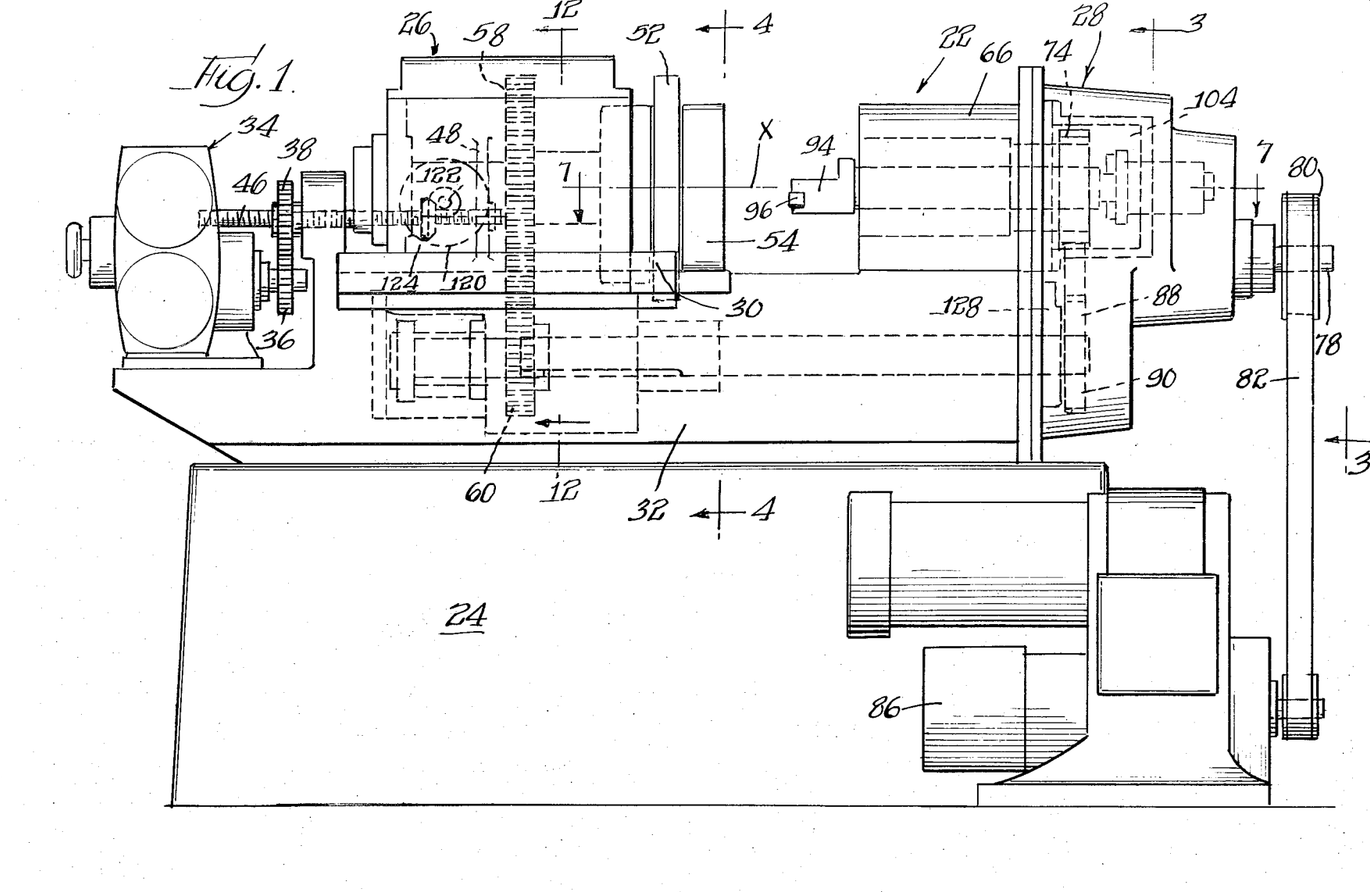
FIG. 1 is a front elevational view of a machine or apparatus for forming epitrochoidal surfaces and is representative of one embodiment of the invention contemplated by the present application.
Figures 2, 3, 4:
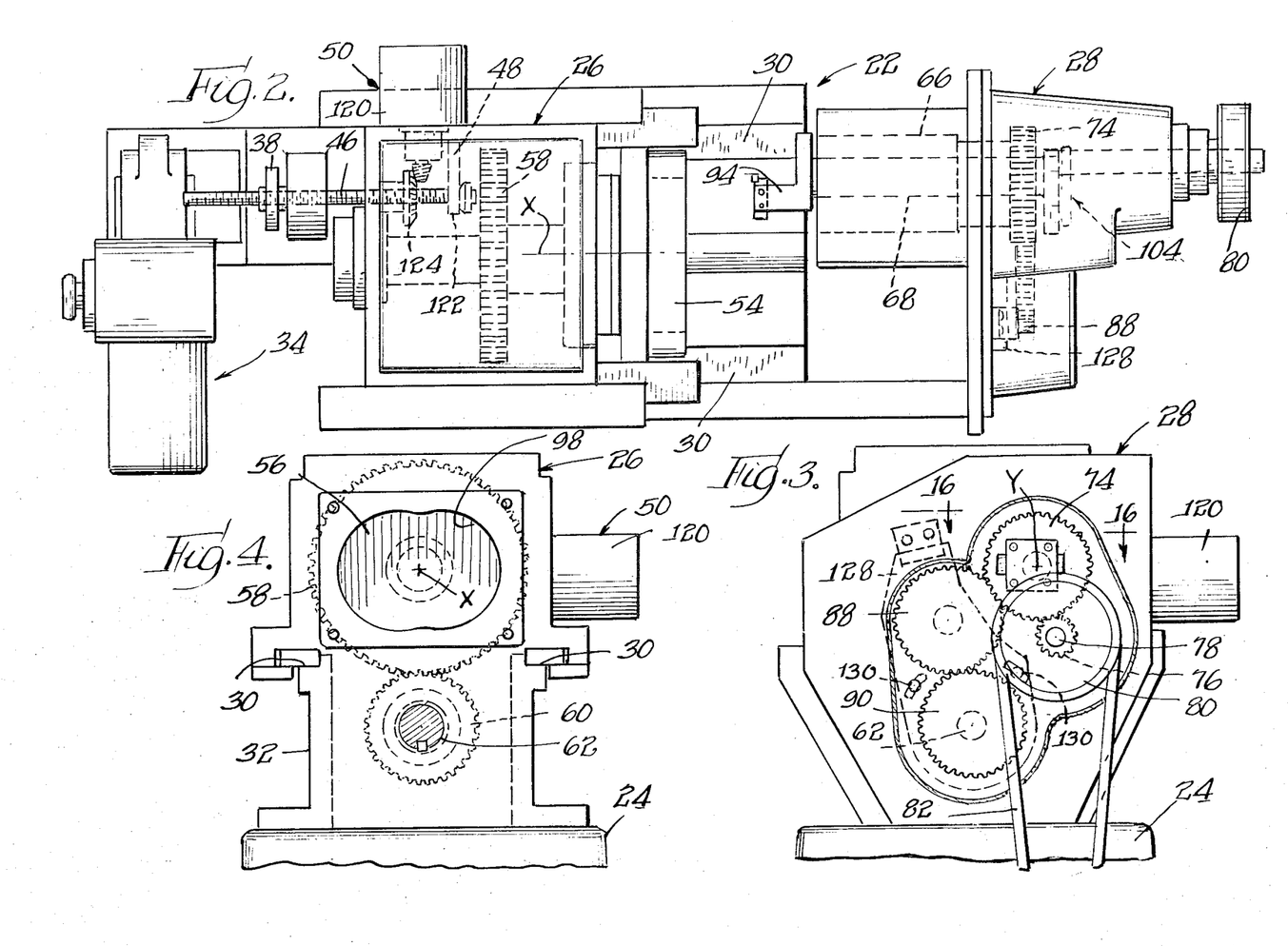
FIG. 2 is a plan view of the apparatus disclosed in FIG. 1.
FIG. 3 is an end view of the upper portion of the machine, said view being taken substantially along the line 3—3 of FIG. 1.
FIG. 4 is a vertical transverse sectional view of the machine, taken substantially along the line 4—4 of FIG. 1, the base of the machine being broken away.
Figures 5, 6:
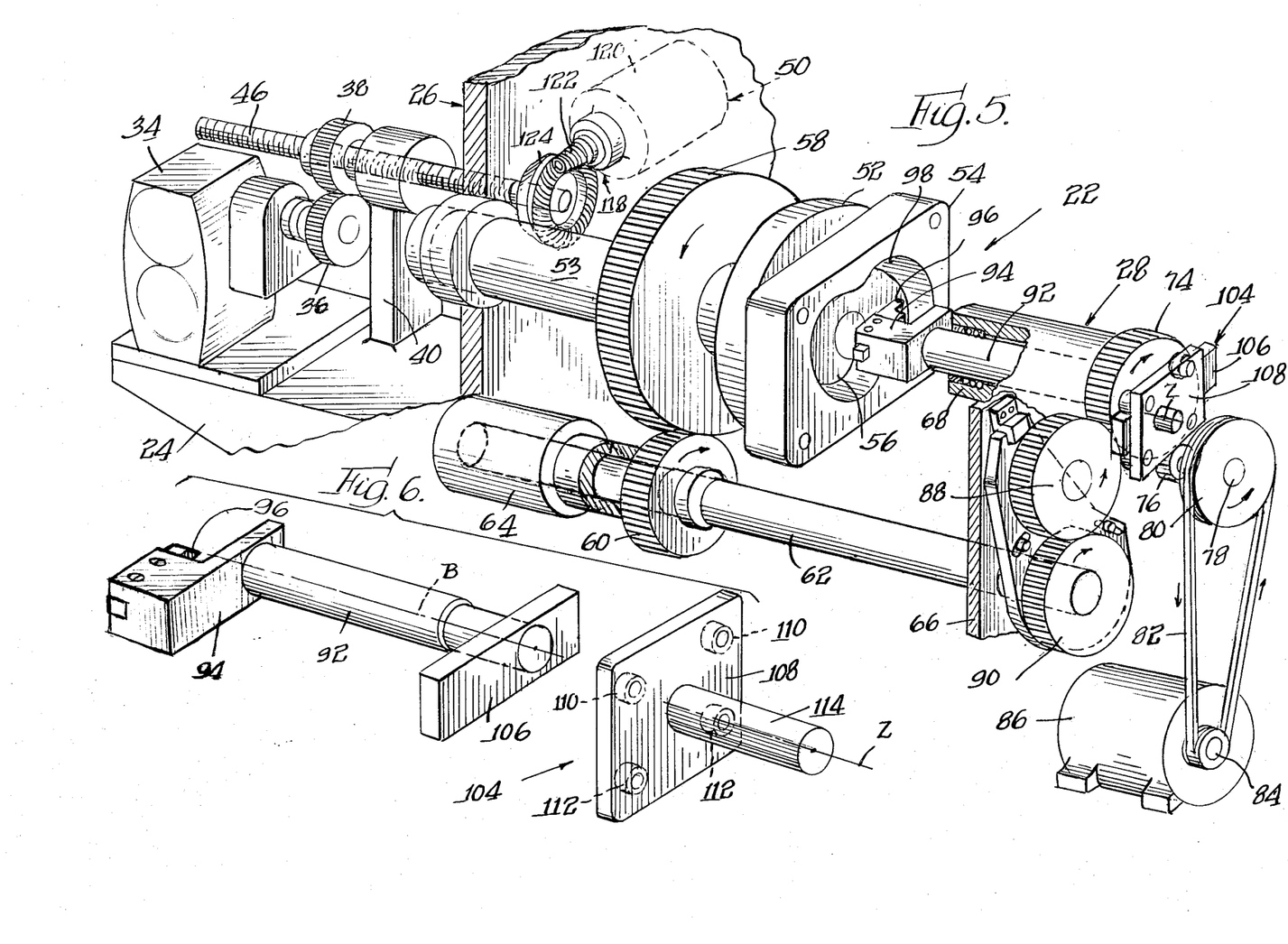
FIG. 5 is a perspective view more clearly to illustrate the details of the machine as illustrated in FIGS. 1 to 4, inclusive.
FIG. 6 is a perspective view disclosing the novel mechanism for coupling the actuator spindle with the tool supporting member or bar, said parts being disclosed in separated relation.
Figure 13:
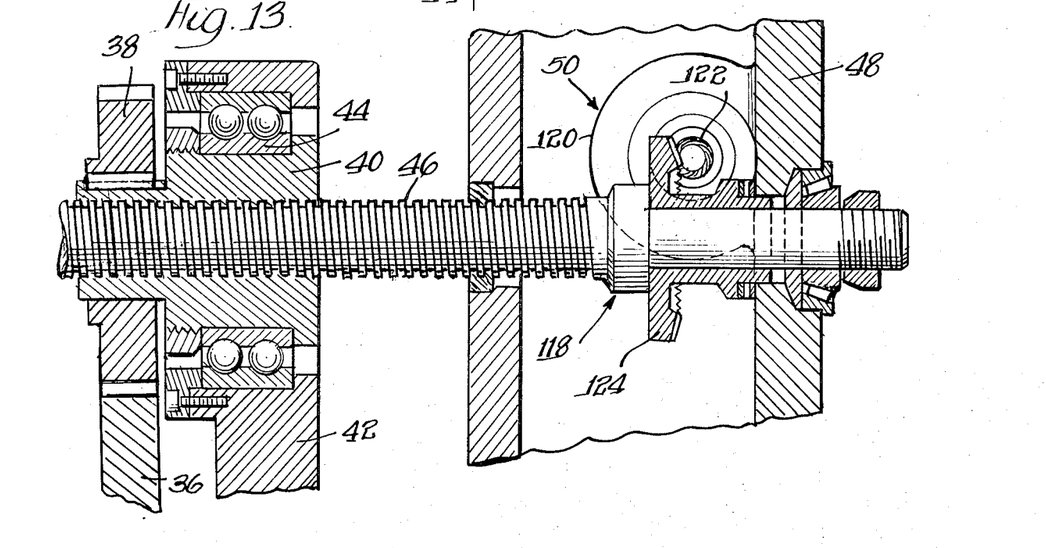
FIG. 13 is a fragmentary vertical sectional view taken substantially along the line 13—13 of FIG. 12 illustrating the rapid reverse gearing and lead screw.

A suitable electric motor 34, FIGS. 1, 2 and 5, drives a gear 36 which meshes with a gear 38 secured to the hub of an internally threaded sleeve or feed nut 40, FIG. 13. The feed nut 40 is rotatably mounted at the upper extremity of a stationary frame member by a ball bearing unit 44. It will be apparent therefore that when rotation is imparted to the nut of sleeve 40 through the agency of the gear 38 fixed thereto, longitudinal movement at a feed rate will be experienced by a lead screw 46. The right extremity of the lead screw 46, as viewed in FIGS. 1, 2 and 13, is coupled with and rotatable within the housing section 48 of the head stock 26. Thus rotation of the nut or sleeve 40 causes the lead screw to impart forward movement of the head stock 26 at a feeding rate. A rapid return mechanism, designated generally by the numeral 50, which is coupled with the lead screw 46, will be described more in detail later in the specification.

Figures 14, 15:
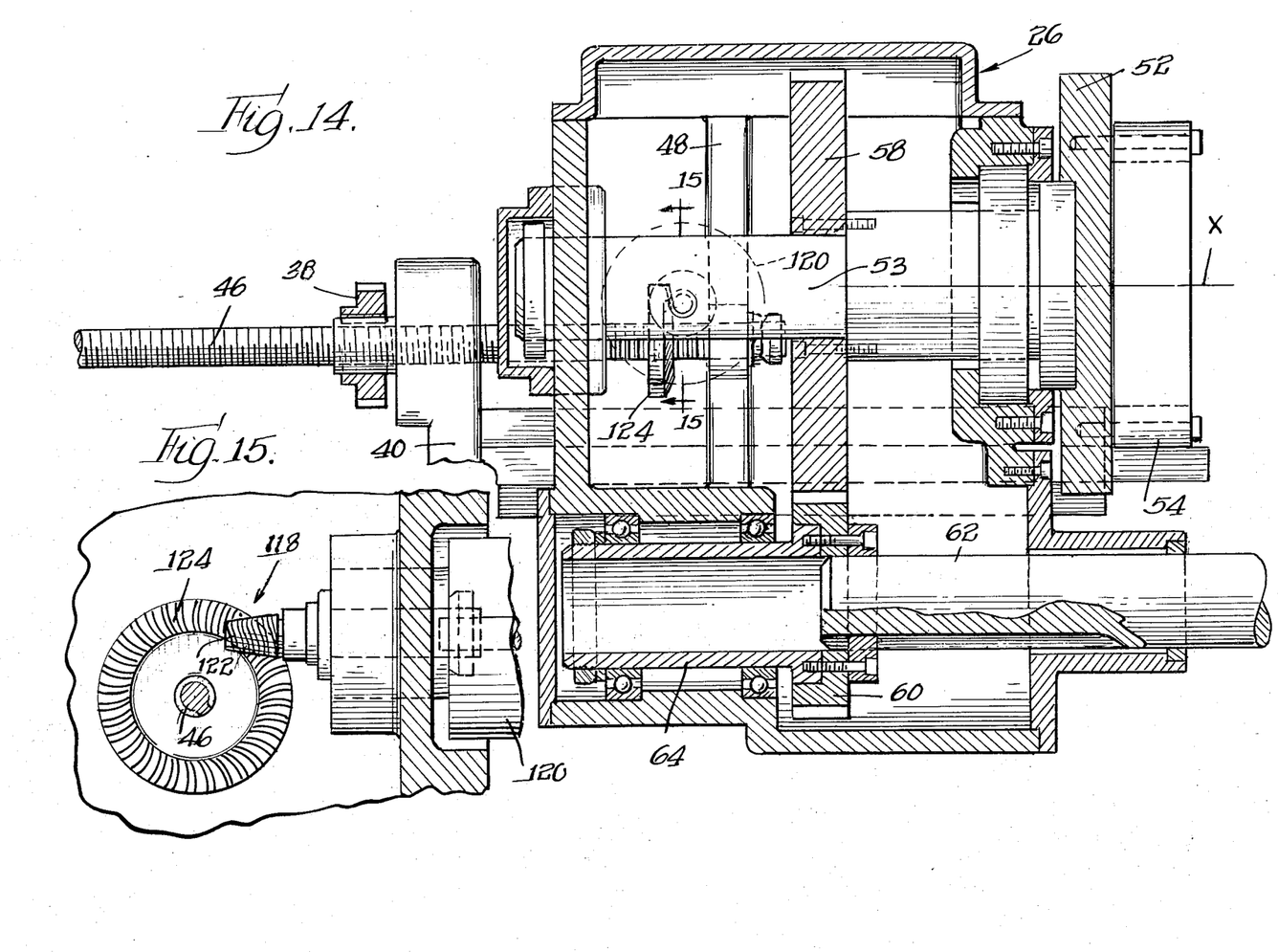
FIG. 14 is a fragmentary vertical sectional view taken substantially along the line 14—14 of FIG. 12.
FIG. 15 is a fragmentary vertical sectional view taken substantially along the line 15—15 of FIG. 14.

The head stock 26 also supports a rotatable mounting member or base 52 which rotates with a supporting shaft 53 about a fixed axis designated by the letter X. The fixed axis is hereinafter designated as the first fixed axis of rotation. The member 52 is designed to accommodate a workpiece such as a recessed cylinder block 54. The workpiece or cylinder block 54 may be secured to the face of the rotary base member 52 in any suitable manner so that the axial center of a cavity 56 in the cylinder block 54 is coincident with the first fixed horizontal axis X. Rotation, arrows, indicated by directional arrow, is imparted to the work-supporting base member 52 by means of a drive gear 58 mounted upon the shaft 53, which gear is in turn driven by a gear 60. The gear 60 is keyed to rotatable drive shaft 62, FIG. 14. As the head stock shifts horizontally on the guideways 30, as an incident to the functioning of the previously described lead screw 46, a sleeve 64 serves to slidably accommodate one extremity of the drive shaft 62. The opposite extremity of the drive shaft 62 is coupled with a a driving mechanism about to be described.

Referring now to the tail stock 28, it will be seen that this includes a housing structure 66, one portion of which supports a hollow spindle 68 rotatable about a second fixed axis Y. Opposite extremities of the hollow spindle 68 are supported by ball bearings 70 and 72. The right extremity of the hollow spindle 68, as viewed in FIG. 7, supports a gear 74 which is rotatably driven in the indicated direction by a smaller gear 76 mounted on a shaft 78. The shaft 78 carries a pulley 80 which is rotatably driven through the agency of a belt or chain 82, connected at its lower extremity to a pulley 84 driven by an electric motor 86. From the foregoing it will be apparent that the hollow spindle 68 is driven from the motor 86 through the aforesaid flexible drive or belt 82, the pulley 80, the gear 76 and the gear 74.

An idler gear 88 is driven from the spindle driving gear 74 and meshes with a gear 90 which is keyed to the right extremity of the drive shaft 62, as viewed in FIG. 5. As previously described, the shaft 62 rotates the gear 60 which meshes with and drives the gear 58 mounted upon the shaft 53 in the head stock 26.

Figure 16:
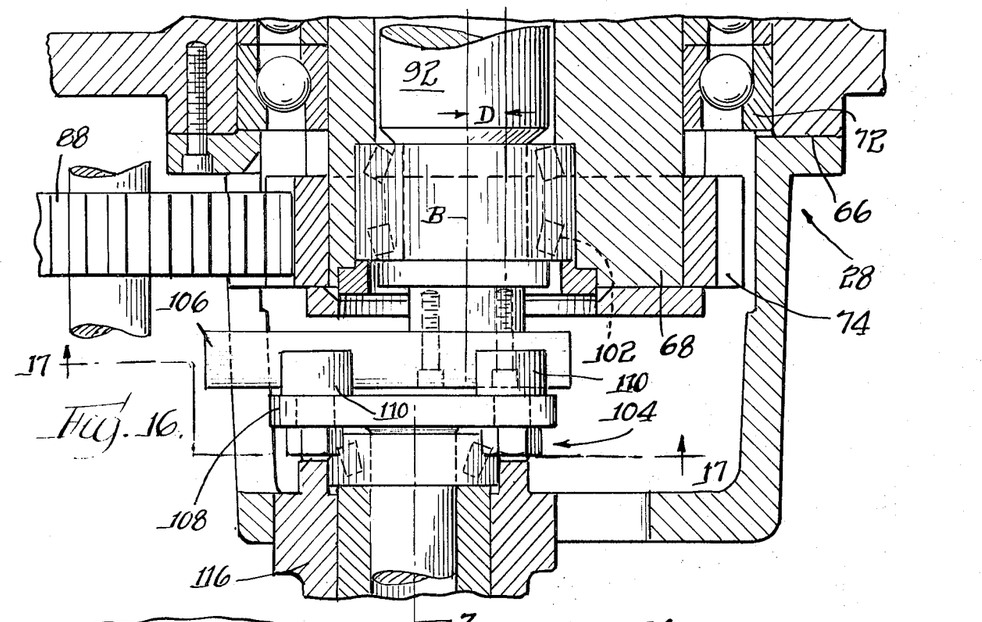
FIG. 16 is a fragmentary horizontal sectional view taken substantially along the line 16—16 of FIG. 3.

Particular attention is now directed to the provision of a tool spindle or boring bar 92, mounted within but not driven by the hollow spindle 68, FIG. 16. The free or left extremity of the tool spindle 92, as viewed in FIGS. 1 and 2, carries a tool-accommodating fixture or head 94 which detachably accommodates a tool member or bit 96. The outer extremity or cutting edge of the tool member 96 is located on the axis B of tool spindle 92 and is adapted to engage a surface 98 which defines the cylinder block cavity 56. The tool member 96, as will later be explained, functions to form with a high degree of accuracy an epitrochoidal surface within the cylinder block 54.

Figures 7, 8, 9, 10, 11:
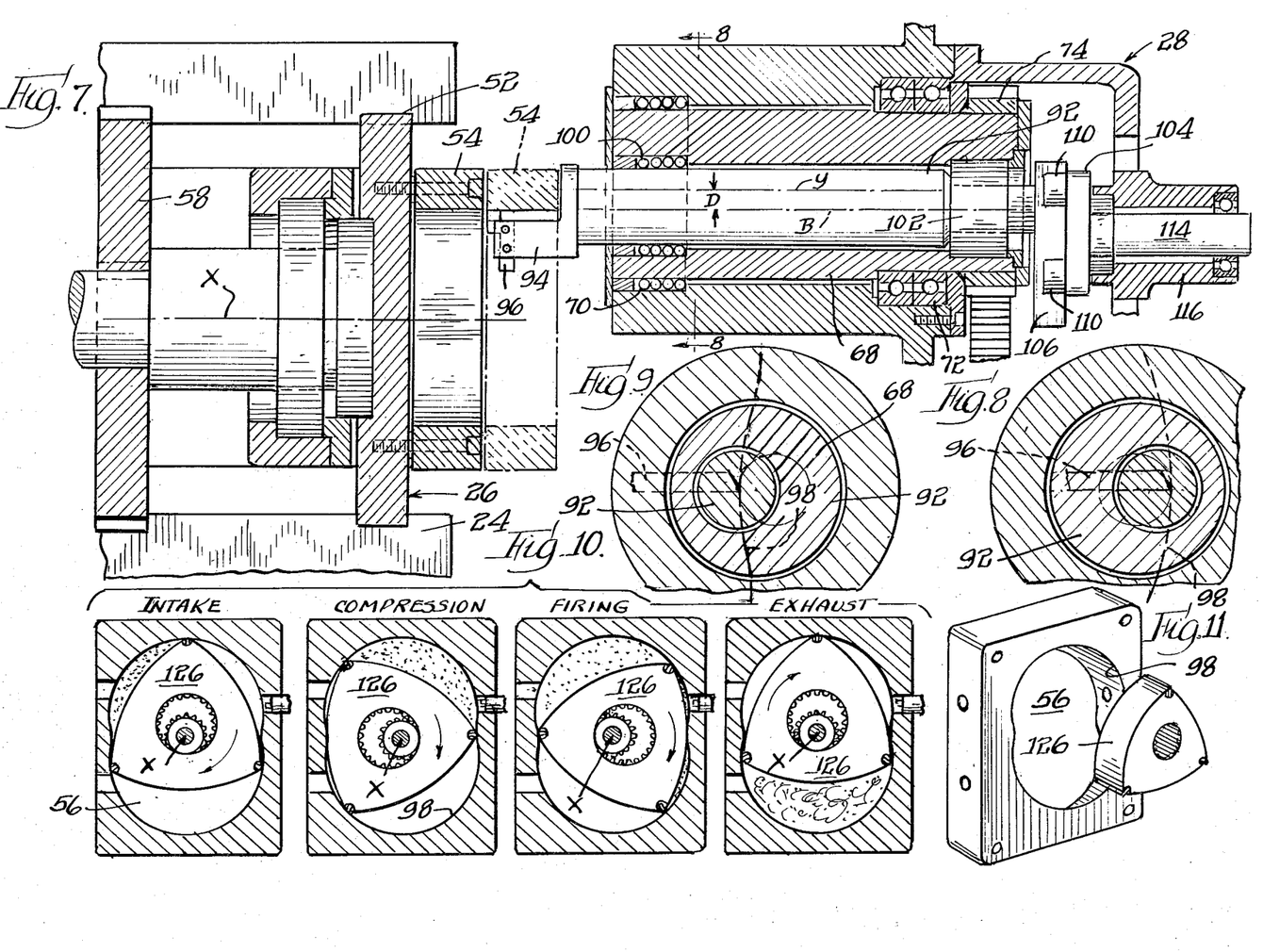
FIG. 7 is a fragmentary horizontal sectional view taken substantially along the line 7—7 of FIG. 1.
FIG. 8 is a fragmentary sectional view taken substantially along the line 8—8 of FIG. 7, to illustrate the manner in which the cutting tool engages a particular surface area of the rotatable workpiece or engine block.
FIG. 9 is a view similar to FIG. 8 disclosing the position occupied by the cutting tool when it is in engagement with another area of the epitrochoidal surface of the workpiece.
FIG. 10 is a semi-diagrammatic illustration disclosing various positions occupied by the rotor of a rotary type internal combustion engine as it revolves within the cavity of the fixed engine or cylinder block.
FIG. 11 is a perspective view of the rotor and cylinder block in separated relation.
Figure 17:
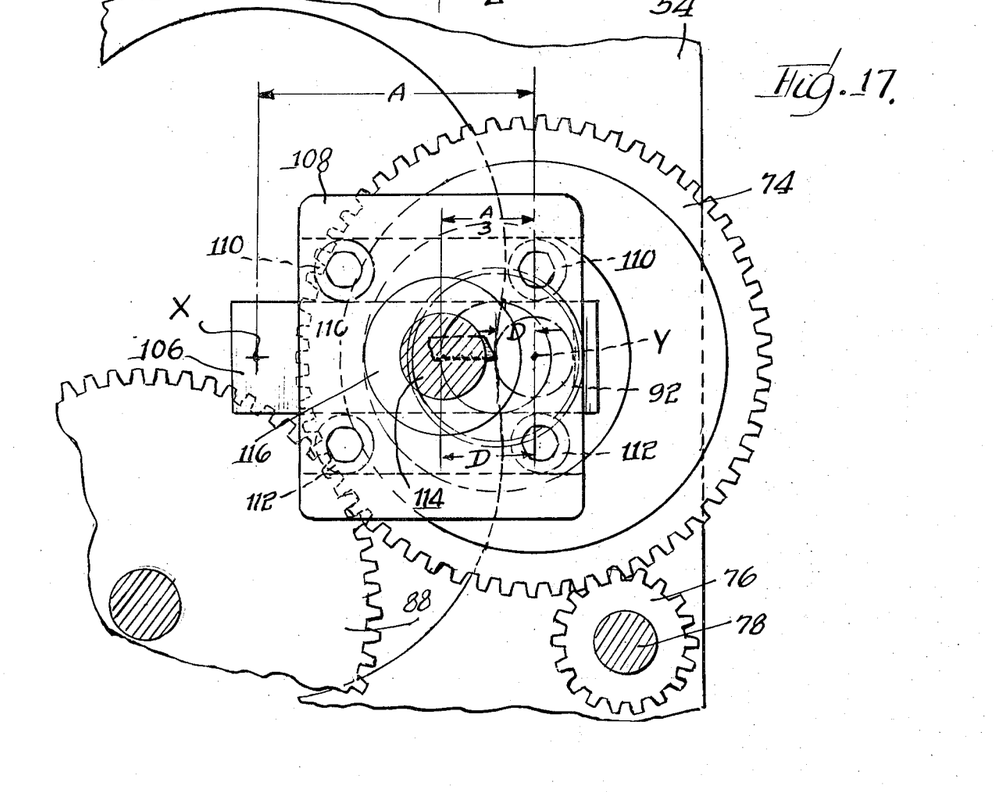
FIG. 17 is a fragmentary vertical sectional view taken substantially along the line 17—17 of FIG. 16.

It will be noted that the tool spindle or boring bar 92 is supported by a ball bearing 100 at one extremity and a roller bearing 102 at the opposite extremity, FIGS. 8 and 16. Particular attention is now directed to applicant's novel tool orienting means, designated generally by the numeral 104. This tool orienting means serves to control the positioning of the cutting edge of the tool 96, as the tool spindle 92 is moved in a circular orbit by the spindle 68. The tool orienting device 104 includes a guide bar 106, formed integral with or fixed to the extremity of the tool spindle 92 and extends transversely thereof, as clearly shown in the perspective view, FIG. 6. Cooperatively disposed with respect to the guide bar 106 is an oscillatable plate 108 supporting a pair of upper rollers 110, and a pair of lower rollers 112. The guide bar 106 is snugly interposed between and guided by the upper and lower pairs of rollers 110 and 112, respectively. The plate 108 is fixed to one extremity of a shaft 114 which is mounted within a sleeve 116, FIG. 7, so as to permit a limited degree of oscillation thereof about a third fixed axis Z. At this point it should be understood that the tool spindle 92 is positioned eccentrically with respect to the second fixed axis of rotation Y of the hollow spindle 68. Thus, as the hollow sleeve or spindle 68 rotates about its fixed axis Y, the tool spindle 92 will move through a circular oribit about said axis. The distance between the axis Y and the axis of the tool spindle 92, designated by the letter B, namely the radius of the said circular orbit, see FIGS. 7, 16 and 17, is indicated by the letter D. The axis of the shaft 114 is designated by the letter Z, hereinafter referred to as the third fixed axis. It will be noted from FIGS. 18 and 19 that the first fixed axis X, the second fixed axis Y, and the third fixed axis Z are parallel with each other and are coincident with a horizontal plane disposed normal to the surface of the face of the rotatable base member 52 upon which the cylinder block 54 is mounted.

Figure 18:
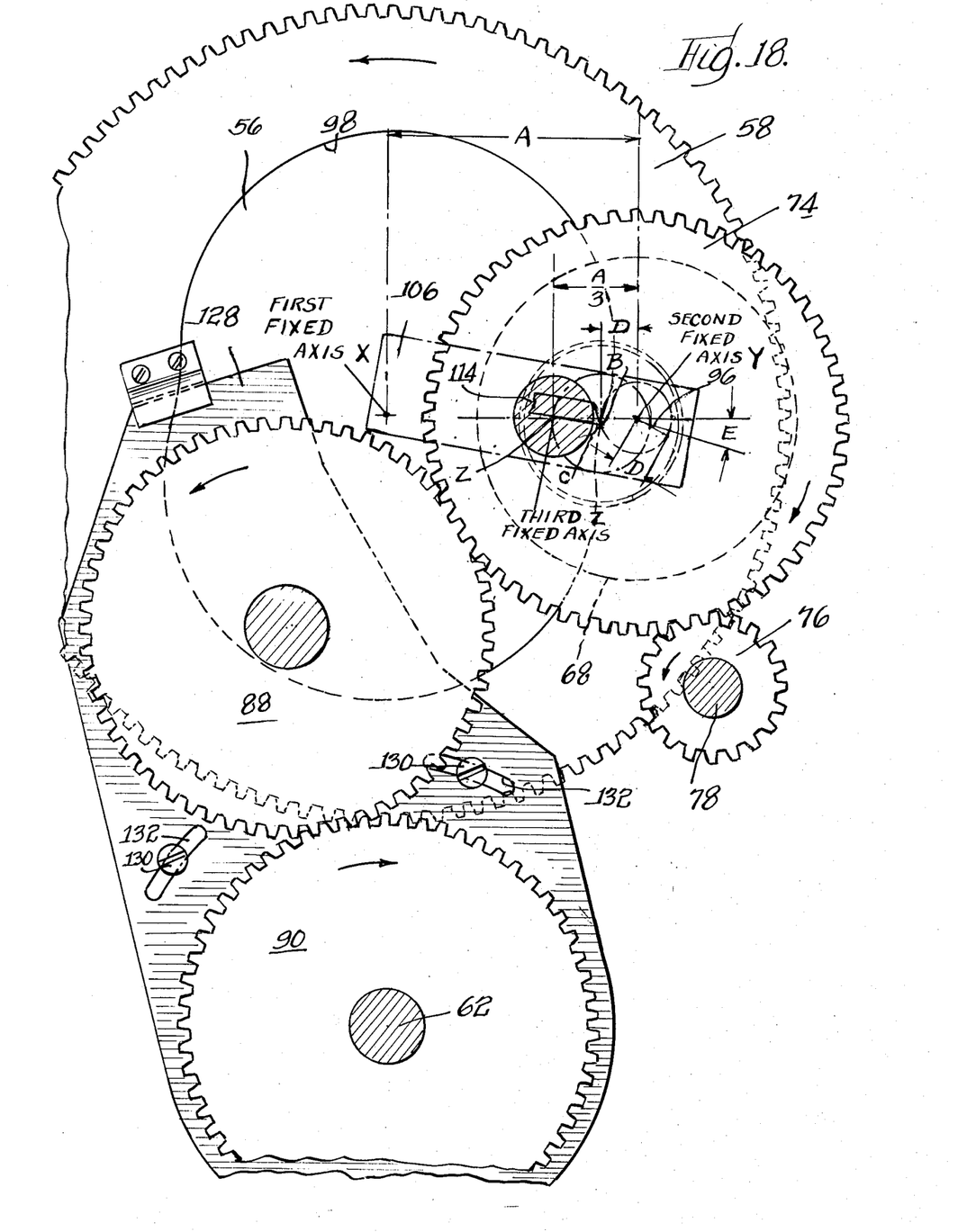
FIG. 18 is a semi-diagrammatic view of the entire engine block cavity, more clearly to illustrate the manner in which the unique coupling mechanism between the actuating spindle and the tool-supporting bar functions to control the movement of the cutting edge of a tool within a presecribed orbit, whereby to form or cut an epitrochoidal surface in the rotating worpiece or cylinder block.
Figure 19:
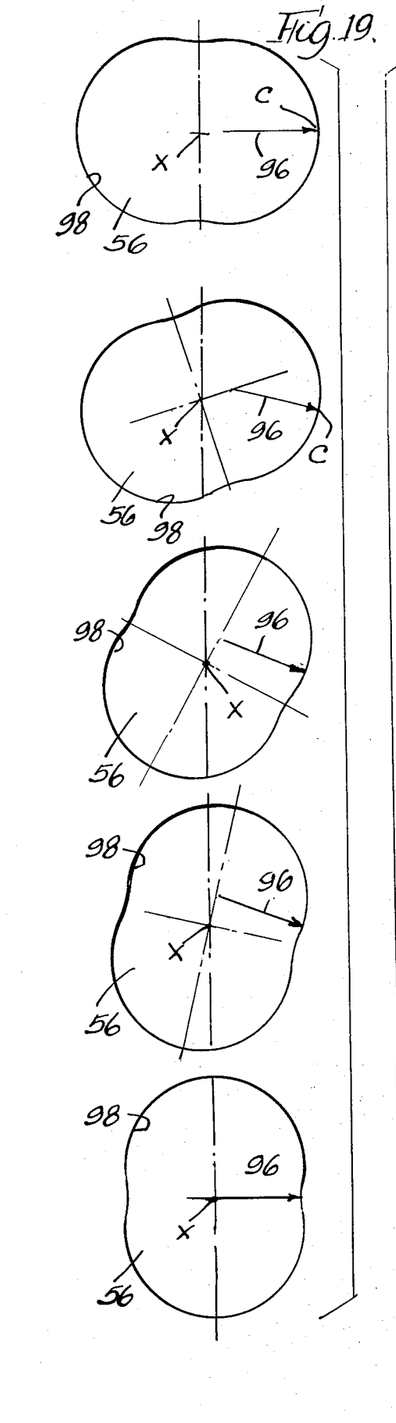
FIG. 19 is somewhat similar to the semi-diagrammatic representation in FIG. 18, more clearly to illustrate the various positions taken by the coupling device during the oscillation thereof, and the corresponding locations of the tool extremity controlled in forming one-fourth of the entire epitrochoidal surface defining the cavity of the engine block.
Figure 20:
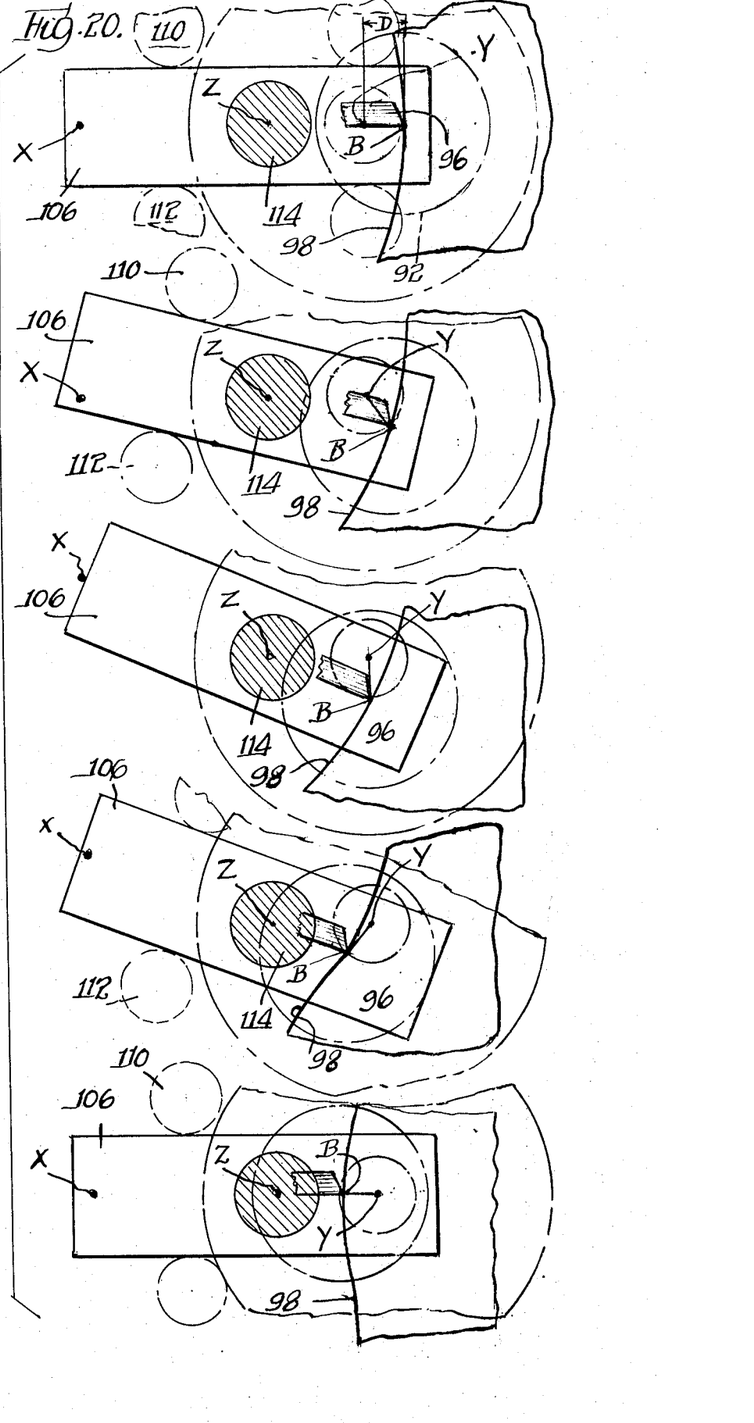
FIG. 20 is a diagrammatic representation of a series of tool positions corresponding with the tool positions illustrated in FIG. 19 as the actuating spindle is rotated through 180°, so as to cause the tool to form one-fourth of the complete epitrochoidal surface.

The machine 22 as above described is adapted to move the cutting tool 96 in a predetermined orbit so as to form an epitrochoidal surface 98 defining a two-lobed cavity 56. In order for the cutting tool 96 to form the epitrochoidal surface 98, the gear 74 which drives the hollow spindle 68 must rotate about the second fixed axis Y at twice the speed of rotation of the gear 58 about the first fixed axis X. In FIG. 18, the distance between the first fixed axis X and the second fixed axis Y is indicated by the letter A. The distance between the second fixed axis X and the third fixed axis Z must be one-third of the distance A. Hence, in FIG. 18, the distance between the axes Y and Z is indicated by A/3. In other words, the speed of rotation of the work-piece is one-half the speed of rotation of the hollow spindle 68, and the distance between the parallel axes Y and Z is one-third of the distance between axes X and Y. As the hollow spindle 68 rotates through an angle indicated by the letter E, FIG. 18, the workpiece 54 will simultaneously experience angular displace of E/2. The distance D, namely the radius of the orbital circle which defines the path of movement of the axis of the tool spindle 92 about the second fixed axis Y, represents the maximum degree of orbital displacement of the cutting edge of the tool 96. The orbital displacement or movement of the cutting edge of the tool 96 is diagrammatically illustrated in FIGS. 19 and 20. FIG. 19 discloses the positions occupied by the tool 96 as the workpiece rotates through 90° from the position shown at the top of the sheet to the position shown at the bottom thereof. During this 90° rotation of the workpiece, the hollow spindle 68 will rotate simultaneously through one hundred and 80°. Thus, the axis B of the tool spindle 92 will shift through one hundred and 80° from the position shown at the top of the page to the position shown at the bottom of the page. This movement of the tool spindle 92 is independent of the rotational movement of the actuating spindle 68. During this period, the unique orbital control device including the cross bar 106 and the roller-supporting plate 108 serves to superimpose a variation in the circular movement of the tool spindle and consequently a corresponding variation in the orbital travel of the tool 96 so that the tool maintains a perpendicualr relationship to the epitrochoidal surface 98. This insures a constant tool geometry, relative to the surface, during the entire cutting action. The roller-carrying plate 108 experiences limited oscillation about the third fixed axis Z, thereby assuring the accurate limited movement of the tool edge along an orbit defining an epitrochoidal curve. The cavity 56 defined by the epitrochoidal surface 98 represents oppositely disposed lobes which in the aggregate are defined by four identical curved surfaces, each of which is formed by the cutting action of the tool 96 as the actuating spindle 68 rotates through 180°. Therefore, as the spindle 68 completes two revolutions, the epitrochoidal surface 98 defining the cavity 56 rotates through 360°.

As previously mentioned, the head stock 26 and the rotating workpiece 54 supported thereby are moved horizontally until the entire surface 98 defining the cavity 56 has been traversed. The workpiece is rotated at relatively high speed in one direction, and the hollow spindle 68 is rotated at a higher speed in the opposite direction. These rotating elements of the machine can be perfectly balanced to eliminate any tendency for the development of vibration. This is an important factor in assuring the formation of epitrochoidal surfaces having the highest degree of accuracy or preciseness.

In order to obtain rapid reversal of the head stock 26 the previously mentioned mechanism 50 is employed. This mechanism includes "Spiroid" gearing designated generally by the numeral 118 which is driven by an electric motor 120. The gearing 118 includes a tapered "Spiroid" worm 122 and a bevel gear 124 keyed to the lead screw 46. Rotation of the lead screw within the nut 40 causes the rapid return travel of the head stock 26.

It is of the utmost importance that backlash in the gearing which simultaneously rotates the hollow tool actuating spindle 68 and the work-supporting base member 52 be avoided. This is accomplished by driving the mechanism by introducing power through the spindle driving gear 74. This power may originate in the electric motor 86. In other words, driving pressure through the gearing is constantly uni-directional and therefore free from any tendency to experience backlash. Also, the gear 58 is relatively large to provide an exceptionally rigid drive. It is important to note that the cutting pressure exerted by the tool 96 against the workpiece 54 is in opposition and develops resistance to the forces imparting rotation of the workpiece, and the torque thus created by this cutting force is uni-directional.

It will be apparent that the torque on spindle 68 changes direction cyclically due to the fact that the cutting force acts alternately on one side and then on the other side of the spindle axis because the tool point or cutting edge is orbiting about this axis in a circle having the radius D. Thus, if power were introduced to the machine through any other member of the basic gear train the cutting tool's action would periodically jump because of backlash, causing errors in the contour being bored. Only by introducing power through the spindle driving gear 74 do all the tooth forces in the gear train remain uni-directional.

The above described machine is equipped with a gear train whereby the speed of rotation of the spindle gear 74 is twice the speed of rotation of the heavy duty work-driving gear 58. With this arrangement, a two-lobed cavity 56 defined by the epitrochoidal surface 98 is formed to accommodate a rotor 126, FIG. 10, having three apices. With the view of descriptive clarity the rotor 126, as illustrated in FIG. 10, is disclosed in its four positions, namely, intake, compression, firing, and exhaust. In order to adapt the above-described machine for producing or forming epitrochoidal surfaces for accommodating rotors having a greater number of apices, it is necessary to change the gearing so as to vary the relationship of the speed of rotation between the spindle driving gear 68 and the heavy duty work driving gear 58. The above described machine embodies a two-to-one speed relation between said gears, and in order to vary this speed differential it is only necessary to replace the idler gears 88 and 90. It will be noted that these gears are mounted upon an adjustable plate member 128. The plate 128 is adjustably mounted upon the machine frame by suitable bolts 130 which extend through arcuate slots 132, FIGS. 3 and 18. For example, if the machine is to be conditioned for forming or cutting a three-lobed epitrochoidal surface to accommodate a rotor having four apieces, the gears 89 and 90 should be replaced by gears which will cause the heavy duty work-driving gear 58 to rotate at one-third the speed of rotation of the spindle-driving gear 68. Likewise, the distance between the second fixed axis Y and the third fixed axis Z should be one-fourth of the distance between the second fixed axis Y and the first fixed axis X (see FIG. 18), or in other words, A/4. The length of A would depend upon the diameter of the rotor to be accommodated.

From the foregoing it will be apparent that the present invention contemplates the provision of apparatus whereby epitrochoidal surfaces may be formed or cut with a high degree of accurancy in an apertured workpiece more rapidly that heretofore possible by employing machines heretofore available. Hertofore, the forming of such surfaces has been very time-consuming and hence quite costly. By employing a single boring tool as described herein, accurately controlled orbital movement thereof enables the efficient formation or cutting of epitrochoidal surfaces. The rigid structural design of the machine makes it possible to rotate relatively heavy cylinder blocks at high speeds, for example 1,000 r.p.m., without experiencing unbalanced or vibratory conditions. This obviously eliminates operational inaccuracies and insures efficient functioning of the constituent parts. The novel device for controlling or superimposing orbital movement of the tool and the ease with which gearing may be changed to accommodate epitrochoidal cavities of varying sizes and shapes, contributes materially to the satisfactory functioning and practical acceptability of the machine. Also, by precluding the introduction of backlash as herein described the smooth cutting action of the tool is assured. Cylinder blocks of rotary type engines are usually in the nature of a metal casting. Thus, in the initial stage before the cutting tool is applied, the preformed cavity of the cylinder is defined by a surface roughly approximating an epitrochoidal shape. This reduces the amount of stock which the cutting tool is required to remove.

Obviously, for purposes of disclosure one embodiment of the invention has been disclosed and described herein, and it should be understood that modifications and changes are contemplated without departing from the spirt and scope of the appended claims.

I claim:

1. Apparatus for forming an epitrochoidal surface in a recessed workpiece, as for example in the cavity of a cylinder block of a rotary type engine, including rotatable base means having a first fixed axis of rotation and having a surface disposed normal to said axis for supporting a workpiece having a preformed cavity with the center of said cavity coincident with the axis of rotation of said base surface, tool actuating means including a sleeve having an eccentric bore therethrough, said sleeve rotatable about a second fixed axis spaced laterally a predetermined distance from and parallel to said first fixed axis, a tool supporting spindle mounted in the bore for relative rotation thereto, tool orienting means operatively connected to the spindle and including a plate means carrying roller means adapted to guide slide means interposed between the roller means, the tool orienting means being thus interconnected to oscillate about a third fixed axis, tool means on the tool supporting spindle having a restricted contact area for engaging the surface defining the cavity of a supported workpiece, said first, second and third fixed axes being parallel and located in a common plane, the distance between said second fixed axis and said third fixed axis being a predetermined fraction of the distance between said first and second fixed axes, said tool orienting means, said tool means, and tool supporting means being cooperatively disposed so as constantly to maintain said third fixed axis and the varying points of contact of said work engaging tool means with the epitrochoidal surface of a supported workpiece in a common plane which is normal to a line tangent to said epitrochoidal surface at each point of tool contact, means for imparting rotation in a given direction to said base means at a given speed, and means for simultaneously imparting rotation to said tool actuating means in an opposite direction at a predetermined speed of rotation greater than the speed of rotation of said base means.

2. Apparatus for forming an epitrochoidal surface in a recessed workpiece as set forth in claim 1, wherein the speed of rotation of said tool actuating means is at least twice the speed of rotation of said work supporting base means.

3. Apparatus for forming an epitrochoidal surface in a recessed workpiece as set forth in claim 1, wherein said first, second and third parallel axes are disposed horizontally.

4. Apparatus for forming an epitrochoidal surface in a recessed workpiece, as set forth in claim 1, wherein means is provided for imparting relative feeding movement to said work-supporting means and said tool means in a direction parallel to the axis of said rotatable work-supporting means.

5. Apparatus for forming an epitrochoidal surface in a recessed workpiece as set forth in claim 4, wherein means is provided for imparting relative rapid reverse movement to said work-supporting means and tool means.

6. Apparatus for forming an epitrochoidal surface in a recessed workpiece as set forth in claim 1, wherein said tool supporting means is eccentrically positioned with respect to said second fixed axis and, as an incident to the rotation of said tool actuating means, said tool supporting means is adapted to be urged along a circular orbital path, the radius of which is equal to the maximum degree of lateral displacement of a supported tool means while experiencing said orbital movement.

7. Apparatus for forming an epitrochoidal surface in a recessed workpiece as set forth in claim 6, wherein said control means is cooperatively disposed to impart orbital movement to a supported tool means deviating from the aforesaid circular orbital path, thereby cooperating to assure proper predetermined positioning of the tool means for producing an epitrochoidal surface in a supported workpiece.

8. Apparatus for forming an epitrochoidal surface in a recessed workpiece, as for example in the cavity of a cylinder block of a rotary type engine, including rotatable base means having a first fixed axis of rotation and having a surface disposed normal to said axis for supporting a workpiece having a preformed cavity with the center of said cavity coincident with the fixed axis of rotation of said base, tool actuating means rotatable about a second fixed axis spaced laterally a predetermined distance from and parallel to said first fixed axis, tool means for engaging the surface defining the cavity of a supported workpiece, tool supporting means associated with said actuating means for imparting predetermined orbital movement to a supported tool so as constantly to maintain the points of contact of said tool with the surface defining the work cavity in a path conforming precisely with an epitrochoid, and means for imparting rotation to said work-supporting base means in one direction and said rotatable tool actuating means in the opposite direction, including a source of power introduced to the apparatus through said actuating means and a gear train means interposed between said actuating means and said work supporting base means whereby to insure unidirectional driving force to said gear train means and preclude the development of backlash during rotation of the tool actuating means.

9. Apparatus for forming an epitrochoidal surface in a recessed workpiece as set forth in claim 8, wherein the tool supporting means includes elongate means eccentrically positioned within and extending parallel to the axis of said rotary tool actuating means.

10. Apparatus for forming an epitrochoidal surface in a recessed workpiece as set forth in claim 8, wherein the control means associated with said tool actuating means for imparting orbital movement to a supported tool includes a device which is oscillatable about a fixed axis parallel with and spaced laterally of the axis of rotation of said rotatable base means and the axis of said rotatable tool actuating means.

11. Apparatus for forming an epitrochoidal surface in a recessed workpiece as set forth in claim 8, wherein the elongate tool supporting means is in the nature of a boring bar spindle which is positioned within and eccentrically of the axis of said rotatable tool actuating means.

12. Apparatus for forming an epitrochoidal surface in a recessed workpiece as set forth in claim 8, wherein means is provided for imparting relative feeding movement to said work-supporting base means and said tool in a direction parallel to the axis of said work-supporting base means.

13. Apparatus for forming an epitrochoidal surface in a recessed workpiece as set forth in claim 1, wherein a source of power is introduced to the apparatus through said actuating means and a gear train means is interposed between said actuating means and said work-supporting base means whereby to assure unidirectional driving force to said gear train means and preclude the development of backlash.

14. Apparatus for forming an epitrochoidal surface in a recessed workpiece, as for example in the cavity of a cylinder block of a rotary type engine, a machine frame, a shiftable head stock, including rotatable base means mounted in said head stock having a first fixed axis of rotation and having a surface disposed normal to said axis for supporting a workpiece having a preformed cavity with the center of said cavity coincident with the axis of rotation of said base surface, a fixed tail stock on said machine frame, tool actuating means including an elongated sleeve with an eccentric bore extending therethrough mounted in said tail stock and rotatable about a second fixed axis spaced laterally a predetermined distance from and parallel to said first fixed axis, tool means having a restricted material removing cutting edge for engaging the surface defining the cavity of a supported workpiece, the tool means being in the form of a boring tool having its cutting edge generally coincident with the axis of the eccentric bore, tool supporting spindle positioned in the bore and orbiting means operable as an incident to the rotation of said actuating means for subjecting said tool means to additional orbital movement, control means shiftable about a third fixed axis, said first, second and third fixed axes being parallel and located in a common plane, the distance between said second fixed axis and said third fixed axis being one-third the distance between said first and second fixed axes, said control means, said tool means, and tool supporting means being cooperatively disposed so as constantly to maintain said third fixed axis and the varying points of contact of said work engaging tool means with the epitrochoidal surface of a supported workpiece in a common plane which is normal to a line tangent to said epitrochoidal surface at each point of tool contact, the distance between the second fixed axis and the axis of the eccentric bore defining the maximum degree of orbital displacement of the cutting edge of the tool, means for imparting rotation in a given direction to said base means at a predetermined speed, and means for simultaneously imparting rotation to said tool actuating means in an opposite direction at a speed of rotation twice the speed of rotation of said base means, the means for imparting rotation including a source of power introduced to the apparatus through the tool actuating means to insure unidirectional cutting force of the supported tool against the opposing torque developed by the supported workpiece, and means for propelling said head stock to move a rotating supported workpiece into engagement with a supported tool means.

15. An apparatus for forming an epitrochoidal surface in a recessed workpiece as set forth in claim 1, wherein the slide means is connected directly to the tool supporting spindle and the plate means is connected directly to a shaft having an axis coincident with the third fixed axis to oscillate thereabout.

16. An apparatus for forming an epitrochoidal surface in a recessed workpiece as set forth in claim 1, wherein both extremities of the sleeve are supported by bearings and the tool supporting spindle is also mounted in bearings at opposite extremities of the eccentric bore.

17. An apparatus for forming an epitrochoidal surface in a recessed workpiece as set forth in claim 1, wherein the distance between the second fixed axis and first fixed axis is predetermined by the diameter of the rotor to be accommodated in the cavity.

18. An apparatus for forming an epitrochoidal surface in a recessed workpiece as set forth in claim 1, wherein the distance between the second fixed axis and the third fixed axis is one-third the distance between the first fixed axis and the second fixed axis and the tool actuating means is rotated at a speed two times the speed of rotation of the base.

19. An apparatus for forming an epitrochoidal surface in a recessed workpiece as set forth in claim 1, wherein the distance between the second fixed axis and the third fixed axis is one-fourth the distance between the first fixed axis and the second fixed axis and the tool actuating means is rotated at a speed three times the speed of rotation of the base.

* * * * *

UNITED STATES PATENT OFFICE
CERTIFICATE OF CORRECTION

Patent No. 3,812,746                     Dated May 28, 1974

Inventor(s) OLIVER EDWARD SAARI

It is certified that error appears in the above-identified patent and that said Letters Patent are hereby corrected as shown below:

Col. 3, line 13, "way" should be --ways--
Col. 3, line 22, "of" should be --or--
Col. 3, line 44, "arrows" should be --as--
Col. 3, line 45, "arrow" should be --arrows--
Col. 3, line 55, "a a" should be --a--
Col. 6, line 59, "apieces" should be --apices--
Col. 7, line 5, "that" should be --than--
Col. 7, line 6, "hertofore" should be --heretofore--
Col. 8, line 41, "control" should be --tool oriented--
Col. 9, line 13, cancel "the"; after "means" insert --is--

Signed and sealed this 8th day of October 1974.

(SEAL)
Attest:

McCOY M. GIBSON JR.                     C. MARSHALL DANN
Attesting Officer                       Commissioner of Patents